United States Patent
Pautis et al.

(10) Patent No.: US 9,919,804 B2
(45) Date of Patent: Mar. 20, 2018

(54) PROPULSION ASSEMBLY INCORPORATING A TURBOFAN AND A MOUNTING PYLON ENABLING A NEW DISTRIBUTION OF THE FORCES BETWEEN THE TURBOFAN AND THE WING

(71) Applicant: Airbus Operations SAS, Toulouse (FR)

(72) Inventors: Olivier Pautis, Merville (FR); Rohan Nanda, Toulouse (FR)

(73) Assignee: Airbus Operations SAS (FR)

( * ) Notice: Subject to any disclaimer, the term of this patent is extended or adjusted under 35 U.S.C. 154(b) by 349 days.

(21) Appl. No.: 15/008,593

(22) Filed: Jan. 28, 2016

(65) Prior Publication Data

US 2016/0221682 A1 Aug. 4, 2016

(30) Foreign Application Priority Data

Jan. 30, 2015 (FR) ..................... 15/50737

(51) Int. Cl.
*B64D 27/18* (2006.01)
*B64D 27/26* (2006.01)

(52) U.S. Cl.
CPC ............ *B64D 27/26* (2013.01); *B64D 27/18* (2013.01); *B64D 2027/262* (2013.01); *B64D 2027/268* (2013.01)

(58) Field of Classification Search
CPC ........ B64D 27/00; B64D 27/18; B64D 27/26; B64D 2027/262; B64D 2027/266; B64D 2027/268
See application file for complete search history.

(56) References Cited

U.S. PATENT DOCUMENTS

| 4,013,246 A | 3/1977 | Nightingale |
| 4,437,627 A * | 3/1984 | Moorehead ............ B64D 27/18 |
| | | 244/110 B |

(Continued)

FOREIGN PATENT DOCUMENTS

| FR | 2295876 A1 | 7/1976 |
| FR | 2887850 A1 | 1/2007 |

OTHER PUBLICATIONS

French Search Report (dated Nov. 19, 2015) (FR 1550737).

*Primary Examiner* — Tien Q Dinh
*Assistant Examiner* — Michael A. Fabula
(74) *Attorney, Agent, or Firm* — Lerner, David, Littenberg, Krumholz & Mentlik, LLP

(57) ABSTRACT

A propulsion assembly includes a turbojet incorporating a fan casing and a central casing around a longitudinal axis, a mounting pylon having a rigid structure, a forward engine attachment interposed between a forward extremity of the rigid structure and an upper part of the fan casing, the upper part being in a vertical median plane (P) passing through the longitudinal axis, an aft engine attachment interposed between a median zone of the rigid structure and an upper aft part of the central casing, and a device for absorbing the thrust forces generated by the turbojet, including two links placed either side of the median plane (P) and hinged, on one hand, forward, on a forward part of the central casing, and on the other, aft, directly on the rigid structure. Such an arrangement enables a reduction of the stresses, and the possibility of designing a simplified rigid structure.

10 Claims, 3 Drawing Sheets

(56) References Cited

U.S. PATENT DOCUMENTS

| | | | | |
|---|---|---|---|---|
| 5,409,184 A * | 4/1995 | Udall | B64D 27/12 | 244/54 |
| 5,452,575 A * | 9/1995 | Freid | B64D 27/18 | 244/54 |
| 5,620,154 A * | 4/1997 | Hey | B64D 27/18 | 244/54 |
| 5,725,181 A * | 3/1998 | Hey | B64D 27/18 | 244/54 |
| 5,873,547 A * | 2/1999 | Dunstan | B64D 27/18 | 244/54 |
| 6,474,597 B1 * | 11/2002 | Cazenave | B64D 27/18 | 244/54 |
| 8,322,652 B1 * | 12/2012 | Stretton | B64D 27/26 | 244/54 |
| 8,814,079 B2 * | 8/2014 | Teulou | B64D 27/26 | 244/54 |
| 2001/0025902 A1 * | 10/2001 | Jule | B64D 27/18 | 244/54 |
| 2004/0251380 A1 * | 12/2004 | Pasquer | B64D 27/26 | 244/54 |
| 2004/0251381 A1 * | 12/2004 | Pasquer | B64D 27/26 | 244/54 |
| 2005/0067528 A1 * | 3/2005 | Loewenstein | B64D 27/26 | 244/54 |
| 2005/0274485 A1 * | 12/2005 | Huggins | B22C 9/22 | 164/349 |
| 2007/0069068 A1 * | 3/2007 | Lafont | B64D 27/26 | 244/54 |
| 2007/0069069 A1 * | 3/2007 | Diochon | B64D 27/26 | 244/54 |
| 2007/0120010 A1 * | 5/2007 | Huggins | B22C 9/22 | 244/54 |
| 2008/0169377 A1 * | 7/2008 | Levert | B64D 27/26 | 244/54 |
| 2008/0217502 A1 * | 9/2008 | Lafont | B64D 27/26 | 248/554 |
| 2008/0245926 A1 * | 10/2008 | Journade | B64D 27/26 | 244/54 |
| 2008/0251634 A1 * | 10/2008 | Bernardi | B64D 27/18 | 244/54 |
| 2009/0200419 A1 * | 8/2009 | Levert | B64C 27/26 | 244/54 |
| 2009/0294579 A1 * | 12/2009 | Eve | B64D 27/18 | 244/54 |
| 2010/0090056 A1 * | 4/2010 | Gardes | B64D 27/26 | 244/54 |
| 2010/0127118 A1 * | 5/2010 | Combes | B64D 27/26 | 244/54 |
| 2010/0170980 A1 * | 7/2010 | Haramburu | B64D 27/26 | 244/54 |
| 2010/0181417 A1 * | 7/2010 | Combes | B64D 27/26 | 244/54 |
| 2010/0181419 A1 * | 7/2010 | Haramburu | B64D 27/26 | 244/54 |
| 2010/0206981 A1 * | 8/2010 | Baillard | B64D 27/26 | 244/54 |
| 2011/0036942 A1 * | 2/2011 | Marche | B64D 27/26 | 244/54 |
| 2011/0121132 A1 * | 5/2011 | Crook | B64D 27/18 | 244/54 |
| 2011/0127371 A1 * | 6/2011 | Takeuchi | B64D 27/18 | 244/54 |
| 2011/0259997 A1 * | 10/2011 | Marechal | B64D 27/26 | 244/54 |
| 2012/0056033 A1 * | 3/2012 | Teulou | B64D 27/26 | 244/54 |
| 2012/0080555 A1 * | 4/2012 | Lafont | B64D 27/26 | 244/54 |
| 2013/0252013 A1 * | 9/2013 | Kermarrec | F16C 7/02 | 428/596 |
| 2014/0369810 A1 * | 12/2014 | Binks | B64D 27/26 | 415/108 |
| 2015/0013142 A1 * | 1/2015 | West | B64D 27/18 | 29/525.08 |
| 2015/0047370 A1 * | 2/2015 | Beaujard | F01D 25/28 | 60/797 |
| 2015/0048201 A1 * | 2/2015 | Takeuchi | B64D 27/26 | 244/54 |
| 2015/0166192 A1 * | 6/2015 | Ewens | B64D 27/26 | 244/54 |
| 2015/0197341 A1 * | 7/2015 | Ewens | B64D 27/26 | 244/54 |
| 2015/0321765 A1 * | 11/2015 | Brochard | B64D 27/26 | 244/54 |
| 2015/0345333 A1 * | 12/2015 | Dubois | B64D 29/06 | 415/214.1 |
| 2016/0215654 A1 * | 7/2016 | Ancuta | F01D 25/04 | |
| 2016/0238032 A1 * | 8/2016 | Hill | F02C 7/20 | |

* cited by examiner

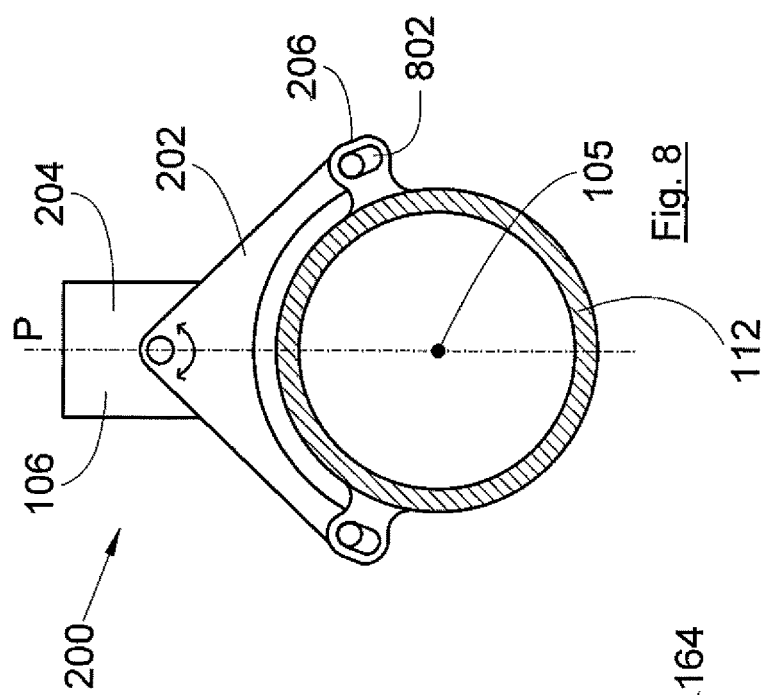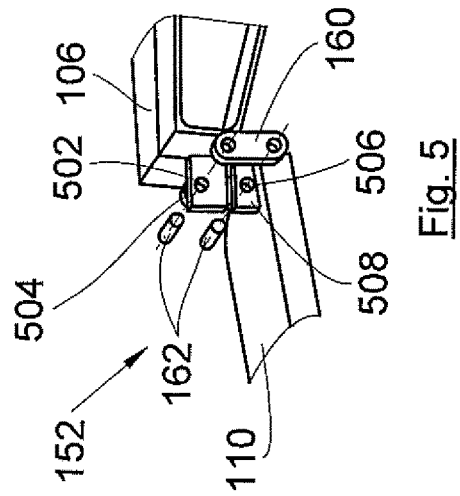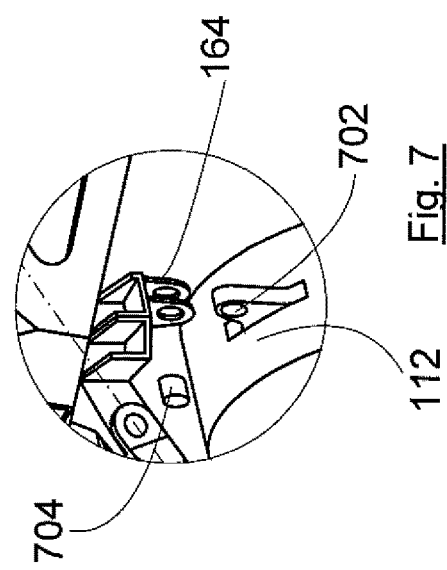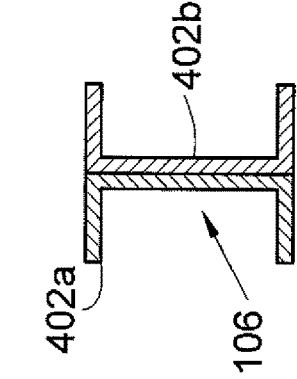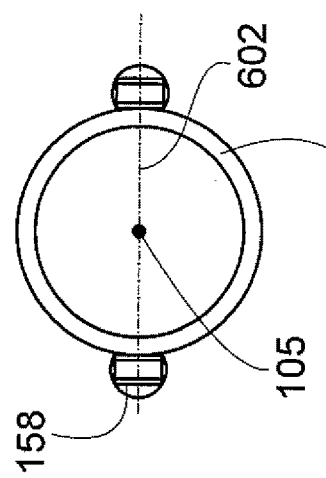

PROPULSION ASSEMBLY INCORPORATING A TURBOFAN AND A MOUNTING PYLON ENABLING A NEW DISTRIBUTION OF THE FORCES BETWEEN THE TURBOFAN AND THE WING

FIELD OF THE INVENTION

This invention relates to the general domain of mounting a turbofan under the wing of an aircraft. It concerns in particular a propulsion assembly including a turbofan, in particular with bypass, together with a mounting device intended for mounting the turbofan under the wing of an aircraft. It also concerns an aircraft equipped with such a propulsion assembly.

BACKGROUND OF THE INVENTION

FIG. 1 shows a propulsion assembly 10 of the prior art, which is fastened under a wing 12 of an aircraft. The propulsion assembly 10 incorporates a turbofan 16 and a mounting pylon 14, by means of which the turbofan 16 is fastened under the wing 12. The mounting pylon 14 generally incorporates a rigid structure 18, also called primary structure, supporting first fastening components intended for mounting the turbofan 16.

These first fastening components are formed from two engine attachments 20 and 22, together with a device 24 for absorbing the thrust forces generated by the turbofan 16.

The mounting pylon 14 further incorporates second fastening components (not illustrated) enabling the mounting pylon 14 to be fastened to the wing 12. Of course, the propulsion assembly 10 is intended to be surrounded by a nacelle (not illustrated).

The mounting pylon 14 also has a plurality of secondary structures 26 added onto the rigid structure 18 and ensuring the segregation and retaining of the systems, at the same time supporting aerodynamic fairing components.

The turbofan 16 incorporates, forward, a fan casing 28 surrounding an annular fan channel, and towards aft, a central casing 30 of a smaller dimension, enclosing the core of the turbofan 16. The casings 28 and 30 are, of course, integral one with the other.

The first fastening components incorporate a forward engine attachment 20, interposed between a forward extremity of the rigid structure 18 and an upper part of the fan casing 28. Furthermore, the first fastening components incorporate the aft engine attachment 22 interposed between the rigid structure 18 and an aft part of the central casing 30.

Finally, these first fastening components incorporate the device for absorbing the thrust forces generated by the turbofan 16, this device including two links 24 (only one of which is visible on FIG. 1) placed either side of a median vertical plane P of the turbofan 16, and hinged, on one hand, on the fan casing 28, and on the other, on a safety element fastened to the rigid structure 18. The device for absorbing the thrust forces formed by the two links 24 and the safety element is designed to absorb the entirety or the majority of the forces oriented along the longitudinal direction of the turbofan 16.

The first fastening components preferably form an isostatic system of connections between the rigid structure 18 and the turbofan 16.

The forward engine attachment 20 enables the absorption of a portion of the forces oriented along the directions Y and Z, this generating high bending moments My and Mz in the forward part of the rigid structure 18, together with a torsional moment Mx. Such loads necessitate the installation of a special rigid structure 18, which takes the shape of a closed box extending from aft towards forward, substantially along the longitudinal direction X, and provided with transverse ribs (not illustrated), each taking the shape of a rectangle oriented in a transverse plane.

Such a structure is therefore relatively complex to design and to embody.

BRIEF SUMMARY OF THE INVENTION

An aspect of the present invention proposes a propulsion assembly including a turbofan and a mounting device intended for mounting the turbofan under a wing of an aircraft, and which does not have the disadvantages of the prior art and which in particular makes it possible to simplify the structure of the mounting pylon.

To that effect, a propulsion assembly of an aircraft having a wing is proposed, said propulsion assembly incorporating:

- a turbofan incorporating a fan casing and a central casing around a longitudinal axis,
- a mounting pylon having a rigid structure,
- a forward engine attachment interposed between a forward extremity of the rigid structure and an upper part of the fan casing, said upper part being in a vertical median plane passing through the longitudinal axis,
- an aft engine attachment interposed between a median zone of the rigid structure and an upper part of the central casing, and
- a device for absorbing the thrust forces generated by the turbofan, including two links placed either side of the median plane and hinged, on one hand, forward, on a forward part of the central casing, and on the other, aft, directly on the rigid structure, enabling, on one hand, absorption of the bending moments (Mz) around a vertical direction Z, and on the other, application, at the forward engine attachment, only of suspension forces of the turbofan along the vertical direction Z and a loading of the forward part of the rigid structure by a simple bending moment (My) around a transverse direction Y, said propulsion assembly incorporating also second fastening components ensuring fastening of the rigid structure to the wing and taking the shape of two lugs fastened either side of the rigid structure at an aft part, and each being pierced by a bore, and, for each link, the longitudinal axis of said link passes through the bore placed on the same side of the rigid structure as that of said link.

Such a mounting makes it possible to have absorption only of the suspension forces oriented along the Z axis at the forward engine attachment and therefore makes it possible to simplify the structure of the rigid structure.

Advantageously, the longitudinal axes of the two links are concurrent in the vertical median plane at the rear of the second fastening components.

Advantageously, the forward part of the rigid structure takes the shape of two C beams placed back to back.

Advantageously, the forward extremity of the rigid structure incorporates a bore whose centreline is parallel to the transverse direction of the turbofan, the upper part of the fan casing incorporates a bore whose centreline is parallel to the transverse direction, and the forward engine attachment consists of two shackles, each shackle accommodating the bore of the rigid structure or the bore of the fan casing, making it possible to put a pin in place in the centreline of each one.

Advantageously, the central casing incorporates two bores parallel to the longitudinal axis and either side of the median plane, the aft engine attachment consists of two female fork ends whose centrelines are parallel to the longitudinal axis, each female fork end accommodating one of the bores secured by putting a pin in place.

Advantageously, each link is fastened to the central casing at an attachment plane passing through the longitudinal axis and parallel to the transverse direction of the turbofan.

Advantageously, the median zone of the rigid structure is presented in the shape of a box incorporating a set of transverse ribs, and one of them is in a plane defined by the longitudinal axis of the link and the transverse direction.

Advantageously, the propulsion assembly incorporates a safety system incorporating a safety element mounted rotationally mobile under the rigid structure and extending either side of the median plane and where each extremity of the safety element is mounted to hinge on the central casing.

Advantageously, at least one of the connections included in the connection between the safety element and the rigid structure, or the connections between the spreader and the central casing are loose.

The invention also proposes an aircraft incorporating a wing and a propulsion assembly according to one of the preceding variants whose rigid structure is fastened under the wing.

BRIEF DESCRIPTION OF THE DRAWINGS

The abovementioned characteristics of the invention, together with others, will emerge more clearly on reading the following description of an example embodiment, said description being made with reference to the attached drawings, among which:

FIG. 4 shows a sectional view of the rigid structure along the line 4-4 of FIG. 3, FIG. 5 shows a partial exploded view of the assembly between the rigid structure and the fan casing of FIG. 3, FIG. 6 shows a front view of the casing of FIG. 3, FIG. 7 shows a partial exploded view of the assembly between the central casing and the aft engine attachment of FIG. 3, and FIG. 8 shows a sectional view along the line 8-8 of FIG. 3.

DETAILED DESCRIPTION OF EMBODIMENTS

Figure 1:
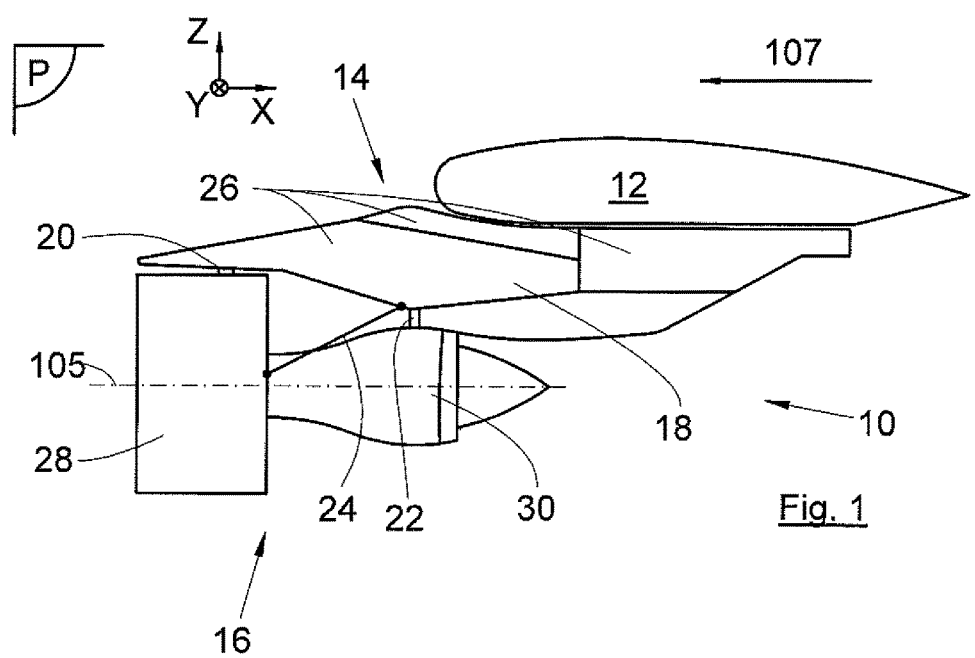
FIG. 1 shows an axial cutaway of an assembly including an aircraft wing and a propulsion assembly of the prior art.
Figure 2:
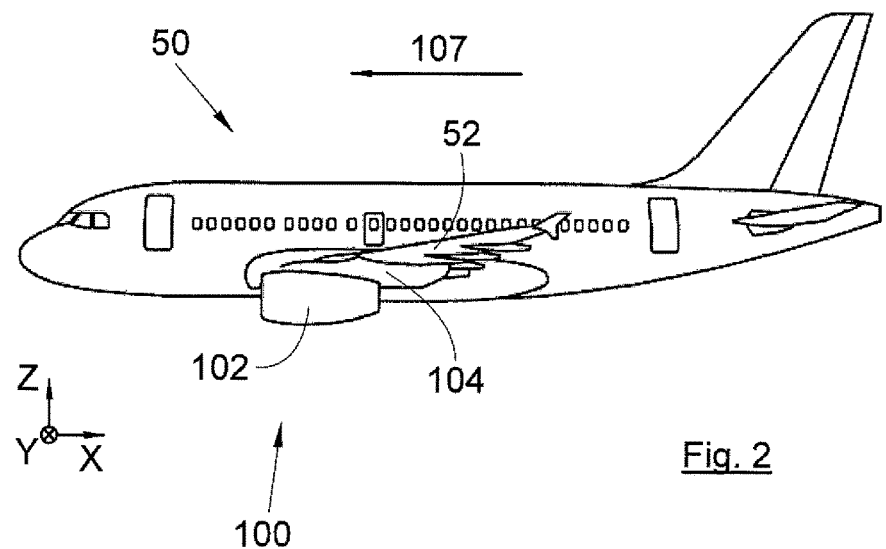
FIG. 2 shows a side view of an aircraft according to the invention.

FIG. 2 shows an aircraft 50 having a wing 52 under which a propulsion assembly 100 is mounted, which incorporates a turbofan 102 and a mounting pylon 104.

By convention, X is the longitudinal direction of the turbofan 102, this direction X being parallel to a longitudinal axis (FIG. 3, 105) of this turbofan 102. Furthermore, Y is the transverse direction of the turbofan 102, which is horizontal when the aircraft is on the ground, and Z is the vertical direction or vertical height when the aircraft is on the ground, these three directions X, Y and Z being mutually orthogonal.

Furthermore, the terms "forward" and "aft" should be considered in relation to a forward-moving direction of the aircraft when the turbofan 102 is functioning, this direction being diagrammatically illustrated by the arrow 107.

Figure 3:
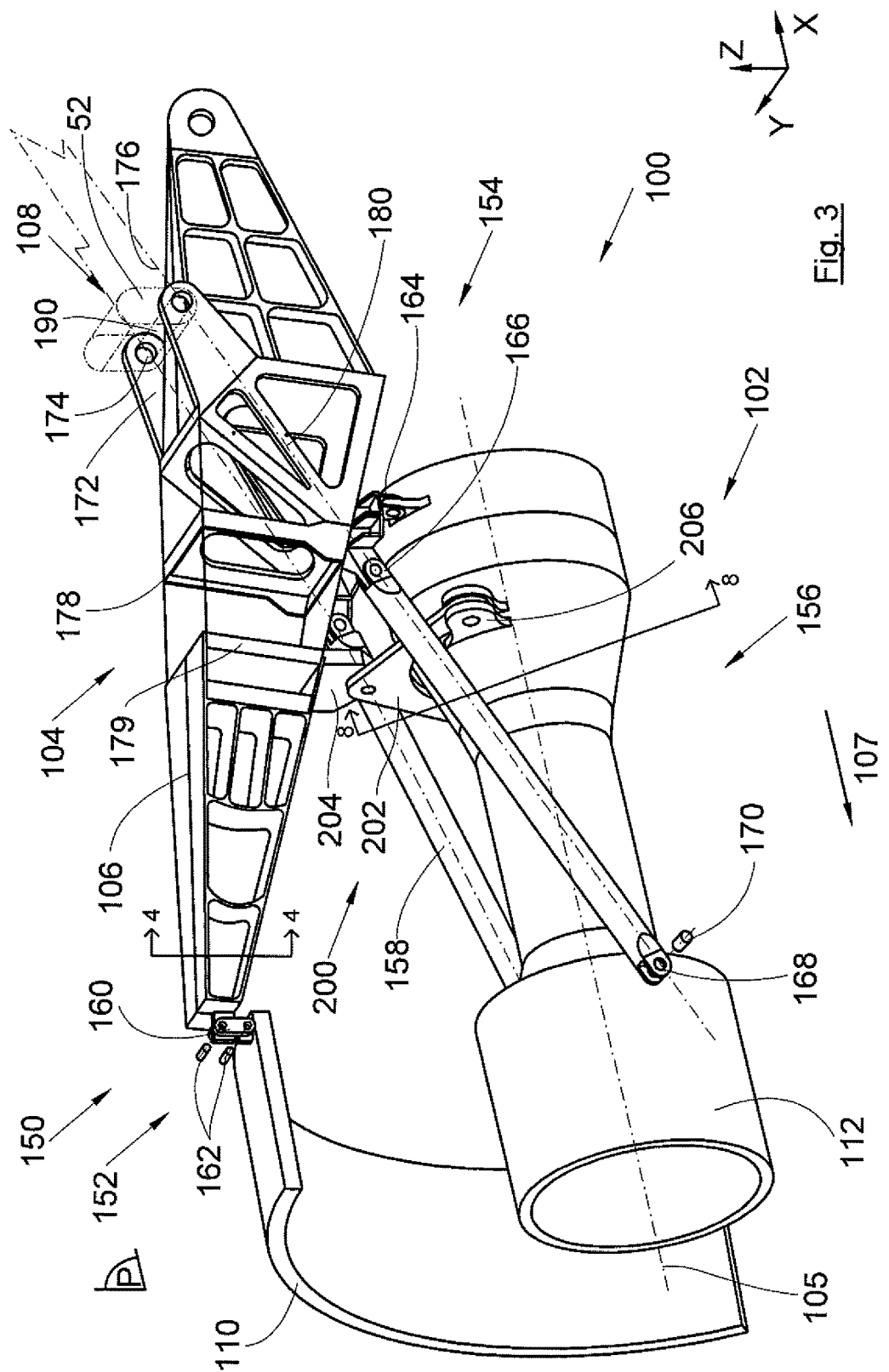
FIG. 3 shows a perspective view of an assembly including an aircraft wing and a propulsion assembly according to the invention.

FIG. 3 shows the propulsion assembly 100, which incorporates the turbofan 102 and the mounting pylon 104 through which the turbofan 102 is fastened to the wing 52. The mounting pylon 104 is illustrated here by the rigid structure 106, also called primary structure, supporting the first fastening components 150 intended for mounting the turbofan 102. The rigid structure 106 extends along the longitudinal direction X between a forward extremity and an aft extremity, between which a median zone is located.

These first fastening components are formed from a forward engine attachment 152 and an aft engine attachment 154, together with a device 156 for absorbing the thrust forces generated by the turbofan 102.

The mounting pylon 104 further incorporates second fastening components 108 enabling fastening of the mounting pylon 104, and more particularly of the rigid structure 106, to the wing 52.

The turbofan 102 incorporates, forward, a fan casing 110 surrounding an annular fan channel, and inside and towards aft of the fan casing 110, a central casing 112 of a smaller dimension, enclosing the core of the turbofan 102. The casings 110 and 112 are integral one with the other.

The forward engine attachment 152 is interposed directly between a forward extremity of the rigid structure 106 and an upper part of the fan casing 110, said upper part being in a vertical median plane XZ of the turbofan 102, this plane passing through the longitudinal axis 105 and henceforth called median plane P. Thus, with the aft engine attachment 154 and the absorption device 156 described below, only the suspension forces of the turbofan 102 along the vertical direction Z are applied at the forward engine attachment 152. The fan casing 110 is therefore suspended under the forward extremity of the rigid structure 106. The forward part of the rigid structure 106 is therefore loaded by a single bending moment (My), contrary to what is obtained in the case of the prior art where the forward part of the rigid structure is loaded by a combined bending moment (My/Mz).

The mounting pylon 104 is symmetrical in relation to the median plane P.

The aft engine attachment 154 is interposed directly between the median zone of the rigid structure 106 and an aft upper part of the central casing 112. The aft engine attachment 154 also enables absorption of the suspension forces of the turbofan 102 along the vertical direction Z together with absorption of the lateral or transverse forces oriented along the direction Y. The aft engine attachment 154 here consists of a plurality of attachment points, which are distributed either side of the median plane P.

The device 156 for absorbing the thrust forces generated by the turbofan 102 includes two links 158 placed either side of the median plane P and hinged, on one hand, forward, on a forward part of the central casing 112, and on the other, aft, directly on the rigid structure 106. The absorption device 156 is designed to absorb the entirety or the majority of the forces oriented along the longitudinal direction of the links 158. The two links 158 are fastened to the rigid structure 106 independently of each other and directly, that is to say, without any mobile intermediary between them and the rigid structure 106 other than their hinging on the rigid structure 106, contrary to the prior art where the safety element is a mobile intermediary component between the links and the rigid structure. The two links 158 also enable absorption of the bending moments Mz. As shown clearly on FIG. 3, the longitudinal axis of the two links 158 are concurrent in the vertical median plane XZ at the rear of the second fastening components 108, thus transferring the moment MZ to the wing 52.

This arrangement makes it possible to prevent the absorption of the combined bending moments (My+Mz+Mx) by means of the forward part of the rigid structure 106 and therefore makes it possible to dispense with a complex structure of the forward part of this rigid structure 106, which can therefore be simplified compared with that of the prior art.

In the embodiment of the invention presented here, the forward part of the rigid structure 106 takes the shape of two C beams 402a, 402b placed back to back in order to constitute an I beam, as illustrated in FIG. 4.

The forward extremity of the rigid structure 106 incorporates a bore 502 whose centreline is parallel to the transverse direction Y, as illustrated in FIG. 5. In the embodiment of FIGS. 3 and 5, the bore is made in a lug 504 that the rigid structure 106 has at its forward extremity.

As illustrated in FIG. 5, the upper part of the fan casing 110 incorporates a bore 506 whose centreline is parallel to the transverse direction Y. In the embodiment of FIG. 3, the bore is made in a lug 508 that the fan casing 110 has at the periphery of its outer crown. This lug is advantageously situated in the aft zone and at twelve o'clock, but this position is not limitative to this latter zone.

The forward engine attachment 152 takes the shape of two shackles 160. Each shackle comprises an upper shackle portion having an opening which cooperates with the bore 502 at the forward extremity of the rigid structure 106, and a lower shackle portion having an opening which cooperates with the bore 506 at the upper part of the fan casing 110. For each shackle, fastening is subsequently ensured by putting a pin 162 through each opening and the respective bore.

The forward engine attachment 152 therefore consists of two shackles, each accommodating the bore 502 of the rigid structure 106 or the bore 506 of the fan casing 110.

The aft engine attachment 154 here takes the shape of two female fork ends 164 whose centrelines are parallel to the longitudinal axis 105, each being placed either side of the median plane P and accommodating a bore 702 parallel to the longitudinal axis 105 of the central casing 112, the bore being secured there by a pin 704, as illustrated in FIG. 7. Each female fork end 164 is rigidly fastened to the median zone of the rigid structure 106.

In the embodiment presented in FIG. 3, the central casing 112 has, for each bore, a lug integral with said central casing 112 and in which the bore is made.

Each link 158 is fastened by a fork end 166 to the rigid structure 106, the centreline of each fork end 166 here is substantially parallel to the transverse direction Y. The two fork end 166 which fix the links 158 to the rigid structure 106 are apart from each other in a direction parallel to the transverse direction Y, thus insuring that the two links 158 work independently of each other.

Each link 158 is fastened to the central casing 112 at a fastening plane 602 passing through the longitudinal axis 105 and parallel to the transverse direction Y, as illustrated in FIG. 6. Fastening here is ensured by a female fork end 168 of the link 158, which accommodates a bore (not illustrated) of the central casing 112, the bore being secured there by a pin 170. The common centreline between the fork end 168, the bore and the pin 170 is contained here in the fastening plane perpendicular to the longitudinal axis 105.

The second fastening components 108 make it possible to fasten the rigid structure 106 to the wing 52 and take the shape of two lugs 172 fastened either side of the rigid structure 106 at an aft part of the rigid structure 106. Each lug 172 is pierced by a bore 174 provided to accommodate a fastening shaft 190 ensuring fastening under the wing 52. The fastening shaft 190 and the wing 52 are illustrated here in a diagrammatic manner with dot-and-dash lines for reasons of clarity.

In order to ensure an improved transfer of the stresses from the turbofan 102 towards the wing 52, each link 158 is placed either side of the rigid structure 106 so that, for each link 158, the longitudinal axis of said link 158 passes through the bore 174 placed on the same side of the rigid structure 106 as that of said link 158. This alignment is illustrated here by the transfer line 176, which coincides with the longitudinal axis of the link 158. The two lugs 172 extend substantially along the direction of the axis 176 for each side. As shown on FIG. 3, the longitudinal axis of a link 158 is concurrent with the axis of each fork end 166, 168 which fixes the link 158 to the rigid structure 106 and to the central casing 112.

The median zone of the rigid structure 106, which is seen as transparent in FIG. 3, is presented in the shape of a box incorporating a set of transverse ribs 178, 179, 180 distributed in planes containing the transverse direction Y and each taking the shape of a rectangle.

In order to ensure an improved transfer of the stresses from the turbofan 102 towards the wing 52, one of the ribs 180 is aligned with the transfer line 176, that is to say that the rib 180 is in a plane defined by the transfer line 176, or again the longitudinal axis of the link 158, and the transverse direction Y.

In other words, it can be said that in order to constitute a "perfect" thrust line, at least one strand of the ribs 180 is longitudinally aligned with the transfer axis 176 and with the bore 174 of a lug 172.

The propulsion assembly 100 has a safety system 200, which allows the turbofan 102 to be retained when an unexpected event happens, like for example, failure of a link 158.

The safety system 200 incorporates a safety element or yoke 202 which is rotationally mounted under the median zone of the rigid structure 106, in particular under the median zone, around an axis of rotation substantially parallel to the longitudinal axis 106 and in the median plane P. To that end, the rigid structure 106 incorporates, under the median zone, a palette 204 on which the safety element or yoke 202 is rotationally mounted.

The palette 204 is in the prolongation of one of the ribs 179 and integral with it.

The safety element 202 extends either side of the median plane P and each of its extremities is mounted to hinge on the central casing 112. To that end, the central casing 112 incorporates two mounting means 206, each one here taking the shape of a female fork end whose centreline is substantially parallel to the longitudinal axis 105, and to each one thereof an extremity of the safety element 202 is mounted to hinge. Due to these three connection points, the safety element 202 here takes a generally triangular shape.

In order to prevent the safety system 200 from generating stresses in normal functioning mode, at least one of the connections included in the connection between the safety element 202 and the rigid structure 106, or the connections between the safety element 202 and the central casing 112 are loose. This loosening play can be obtained, for example, by making oblong holes 802 at the fork ends or at the swivel connection under the rigid structure 106, as illustrated in FIG. 8. When an incident appears, like for example, failure of a link 158, the loosening play is then compensated, for example by a slight deformation of the central casing 112, and the safety element 202 then supports said central casing 112 in order to absorb the bending moments Mz.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly of an aircraft having a wing, said propulsion assembly comprising:
    a turbofan incorporating a fan casing and a central casing around a longitudinal axis;
    a mounting pylon having a rigid structure;
    a forward engine attachment interposed between a forward extremity of the rigid structure and an upper part of the fan casing, said upper part being in a vertical median plane passing through the longitudinal axis;
    an aft engine attachment interposed between a median zone of the rigid structure and an upper part of the central casing; and
    a device for absorbing the thrust forces generated by the turbofan, including two links placed either side of the median plane and hinged, forward, on a forward part of the central casing, and-, aft, directly on the rigid structure, enabling absorption of the bending moments around a vertical direction Z, and, application, at the forward engine attachment, only of suspension forces of the turbofan along the vertical direction Z and a loading of the forward part of the rigid structure by a simple bending moment around a transverse direction Y,
    said propulsion assembly further comprising second fastening components ensuring fastening of the rigid structure to the wing and comprising two flanges fastened either side of the rigid structure at an aft part, and each being pierced by a bore, and, for each link, the longitudinal axis of said link passes through the bore placed on the same side of the rigid structure as that of said link.

2. The propulsion assembly according to claim 1, wherein the longitudinal axis of the two links are concurrent in the vertical median plane at the rear of the second fastening components.

3. The propulsion assembly according to claim 1, wherein the forward part of the rigid structure comprises two C beams placed back to back.

4. The propulsion system according to claim 1, wherein the forward extremity of the rigid structure incorporates a bore having a centerline parallel to the transverse direction (Y) of the turbofan,
    wherein the upper part of the fan casing incorporates a bore having a centerline parallel to the transverse direction (Y),
    wherein the forward engine attachment includes first and second shackles,
    wherein each shackle incorporates a first opening which is aligned with the bore of the rigid structure and a second opening which is aligned with the bore of the fan casing,
    wherein a first pin extends through the respective first openings of each shackle and through the bore of the rigid structure and a second pin extends through the respective second openings of each shackle and through the bore of the fan casing.

5. The propulsion assembly according to claim 1, wherein the central casing incorporates two bores parallel to the longitudinal axis and either side of the median plane, and
    wherein the aft engine attachment includes two female fork ends having centrelines parallel to the longitudinal axis, each female fork end accommodating one of the bores secured by putting a pin in place.

6. The propulsion assembly according to claim 1, wherein each link is fastened to the central casing at an attachment plane passing through the longitudinal axis and parallel to the transverse direction (Y) of the turbofan.

7. The propulsion assembly according to claim 1, wherein the median zone of the rigid structure has a shape of a box incorporating a set of transverse ribs, and
    wherein one of the transverse ribs is in a plane defined by the longitudinal axis of one of the two links and the transverse direction (Y).

8. The propulsion assembly according to claim 1, further comprising a safety system comprising:
    a yoke which is rotationally mounted to the rigid structure and extending to either side of the median plane (P),
    wherein the extremities of the yoke extending to either side of the median plane are mounted to hinges on the sides of the central casing.

9. The propulsion assembly according to claim 8, wherein at least one of the connections included in the connection between the yoke and the rigid structure, or the connections between the yoke and the central casing permits relative movement between the yoke and the rigid structure or between the yoke and the central casing, respectively.

10. An aircraft comprising a wing and a propulsion assembly comprising:
    a turbofan incorporating a fan casing and a central casing around a longitudinal axis;
    a mounting pylon having a rigid structure;
    a forward engine attachment interposed between a forward extremity of the rigid structure and an upper part of the fan casing, said upper part being in a vertical median plane passing through the longitudinal axis;
    an aft engine attachment interposed between a median zone of the rigid structure and an upper part of the central casing; and
    a device for absorbing the thrust forces generated by the turbofan, including two links placed either side of the median plane and hinged, forward, on a forward part of the central casing, and-, aft, directly on the rigid structure, enabling absorption of the bending moments around a vertical direction Z, and, application, at the forward engine attachment, only of suspension forces of the turbofan along the vertical direction Z and a loading of the forward part of the rigid structure by a simple bending moment around a transverse direction Y,
    said propulsion assembly further comprising second fastening components ensuring fastening of the rigid structure to the wing and comprising two flanges fastened either side of the rigid structure at an aft part, and each being pierced by a bore, and, for each link, the longitudinal axis of said link passes through the bore placed on the same side of the rigid structure as that of said link,
wherein rigid structure is fastened under the wing.

* * * * *